(12) United States Patent
Chen

(10) Patent No.: US 6,379,544 B1
(45) Date of Patent: Apr. 30, 2002

(54) PORTABLE DEVICE FOR SUPPLYING FILTERED WATER

(76) Inventor: Han-Ming Chen, No. 341, Chung-Ming S. Rd. Hsi Dist., Taichung City (TW)

( * ) Notice: Subject to any disclaimer, the term of this patent is extended or adjusted under 35 U.S.C. 154(b) by 0 days.

(21) Appl. No.: 09/740,482

(22) Filed: Dec. 19, 2000

(51) Int. Cl.[7] .............................. B01D 35/26; C02F 1/28
(52) U.S. Cl. .................... 210/244; 210/416.3; 210/282; 210/136
(58) Field of Search .............................. 210/416.3, 282, 210/244, 238, 136

(56) References Cited

U.S. PATENT DOCUMENTS

| | | | | |
|---|---|---|---|---|
| 2,473,986 A | * | 6/1949 | Booth | |
| 3,814,292 A | * | 6/1974 | Dargols | |
| 4,054,526 A | * | 10/1977 | Muller | |
| 4,636,307 A | * | 1/1987 | Inoue et al. | |

FOREIGN PATENT DOCUMENTS

| | | | |
|---|---|---|---|
| JP | 45-000637 B | * | 1/1970 |
| JP | 08-229545 A | * | 9/1996 |

\* cited by examiner

*Primary Examiner*—Thomas M. Lithgow

(57) ABSTRACT

A portable device for supplying filtered water includes a container, a cap member, a partitioning member, a filter member, an intake tube, a piston pump unit, and a spout. The partitioning member divides an interior of the container into an outer chamber and an inner chamber. The filter member is disposed on the partitioning member, and has a first inlet communicated with the outer chamber and a first outlet communicated with the inner chamber. The intake tube is disposed in the inner chamber. The piston pump unit is mounted in the cap member, and has second inlet and outlet, and an inner cylindrical wall defining a cylindrical chamber in fluid communication with the second inlet and outlet. The second inlet is further communicated with the intake tube. The second outlet is further communicated with a passage in a piston member through which purified water is drawn up to the spout.

4 Claims, 3 Drawing Sheets

PORTABLE DEVICE FOR SUPPLYING FILTERED WATER

BACKGROUND OF THE INVENTION

1. Field of the Invention

The invention relates to a water filtering device, more particularly to a portable device equipped with a piston pump unit for supplying filtered water.

2. Description of the Prior Art

Containers for supplying filtered water are known in the art. However, they generally lack a water filtering capability and are provided with a cap which has to be removed in order to pour out the water therein, thereby resulting in inconvenience.

SUMMARY OF THE INVENTION

The object of the present invention is to provide a portable device for supplying filtered water, which is provided with a filter member and a piston pump unit for supplying purified water through a spout, and which is convenient to carry.

Accordingly, a portable device for supplying filtered water of this invention includes a container, a cap member, a partitioning member, a filter member, an intake tube, a piston pump unit, and a spout. The container includes upper and lower end walls disposed to be spaced apart from each other in an axial direction, and a circumferential wall extending therebetween and confining an accommodation space. The upper end wall defines an opening to admit entry of water to be purified into the accommodation space. The opening is in fluid communication with the accommodation space. The cap member includes a mounting wall extending in a transverse direction relative to the axial direction, and is disposed to detachably and water-tightly cover the opening. The partitioning member is disposed in the accommodation space, and includes a top wall having a periphery and spaced apart from the mounting wall in the axial direction, and an annular wall extending from the periphery in the axial direction and downwards to engage the lower end wall water-tightly so as to divide the accommodation space into an outer chamber and an inner chamber. The outer chamber is between the circumferential wall and the annular wall, and is in fluid communication with the opening so as to receive the water to be purified. The inner chamber is confined by the annular wall and the top wall. The filter member is disposed on the annular wall, and includes a first inlet disposed to be in fluid communication with the outer chamber, a first outlet disposed downstream of the first inlet and in fluid communication with the inner chamber, and a filtering element disposed downstream of the first inlet and upstream of the first outlet to purify the water passing therethrough. The intake tube is disposed in the inner chamber, and includes a lower portion disposed proximate to the lower end wall and in fluid communication with the inner chamber, and an upper portion extending upwardly from the lower portion in the axial direction. The piston pump unit is disposed to be mounted in the cap member, and includes a second inlet distal to the cap member in the axial direction and in fluid communication with the upper portion, a second outlet proximate to the cap member, and an inner cylindrical wall surrounding an axis parallel to the axial direction and defining a cylindrical chamber that is in fluid communication with the second inlet and outlet. The cylindrical chamber is disposed downstream of the second inlet and upstream of the second outlet. A piston member is provided with an axially extending passage which is disposed to be in fluid communication with the second outlet. The piston member is disposed in the cylindrical chamber, is movable axially relative to the inner cylindrical wall, and extends outwardly of the cap member so as to be actuated externally to lift the purified water up through the passage. The spout is disposed on the piston member, and is in fluid communication with the passage so that the purified water can pass therethrough.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
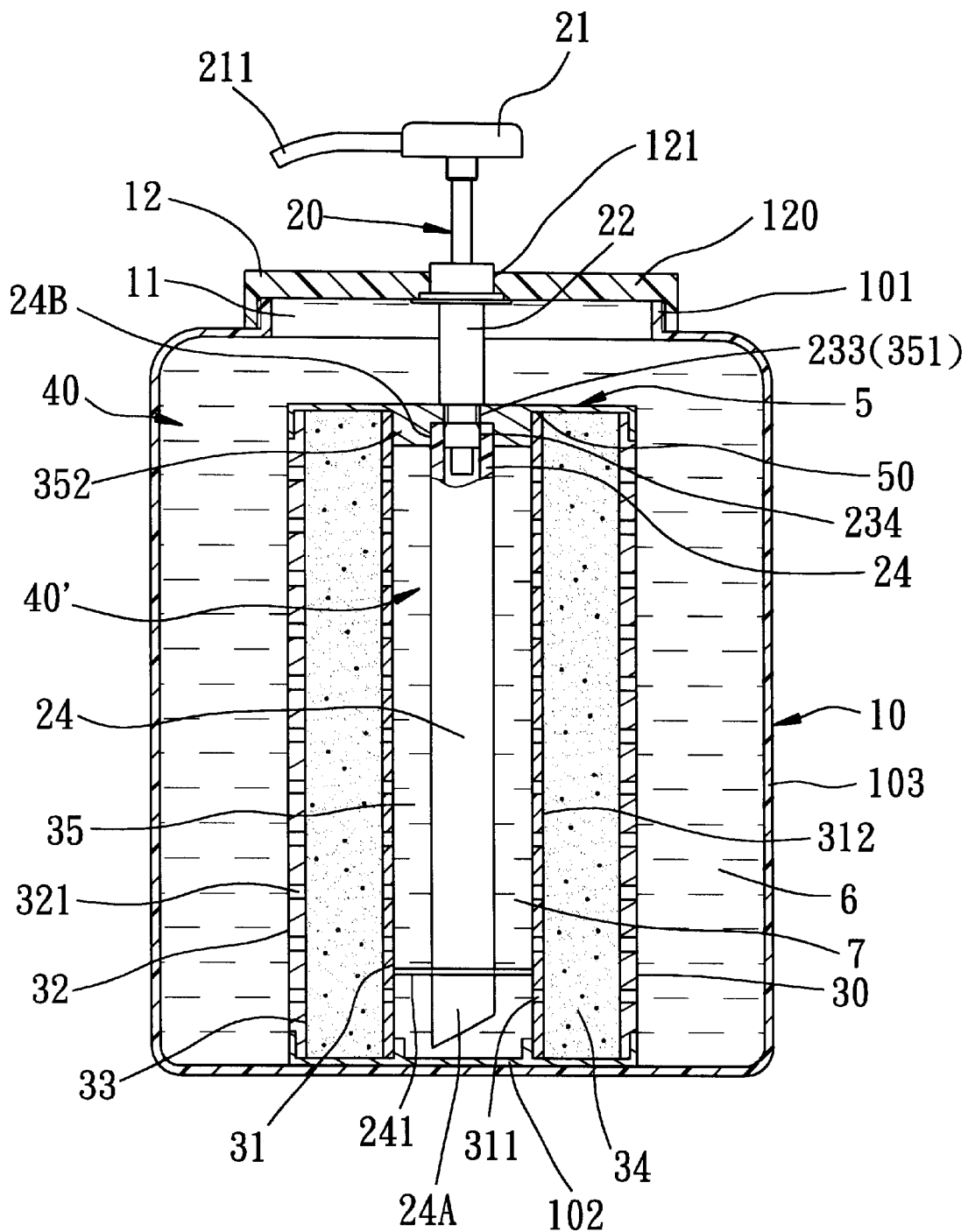
FIG. 1 is a sectional view of the preferred embodiment of a portable device for supplying filtered water according to the invention in an assembled state.
Figure 2:
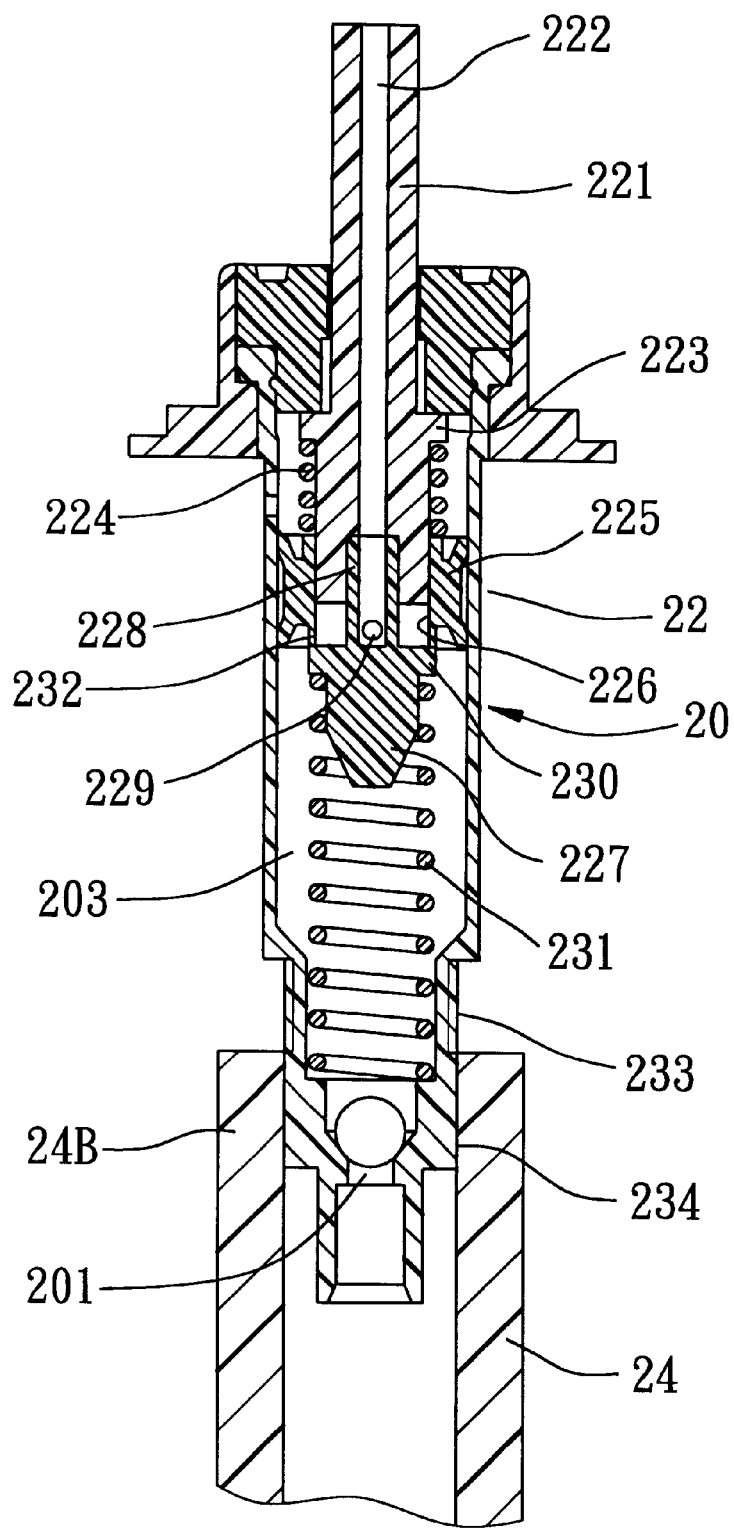
FIG. 2 is a sectional view of a piston pump unit of the preferred embodiment.
Figure 3:
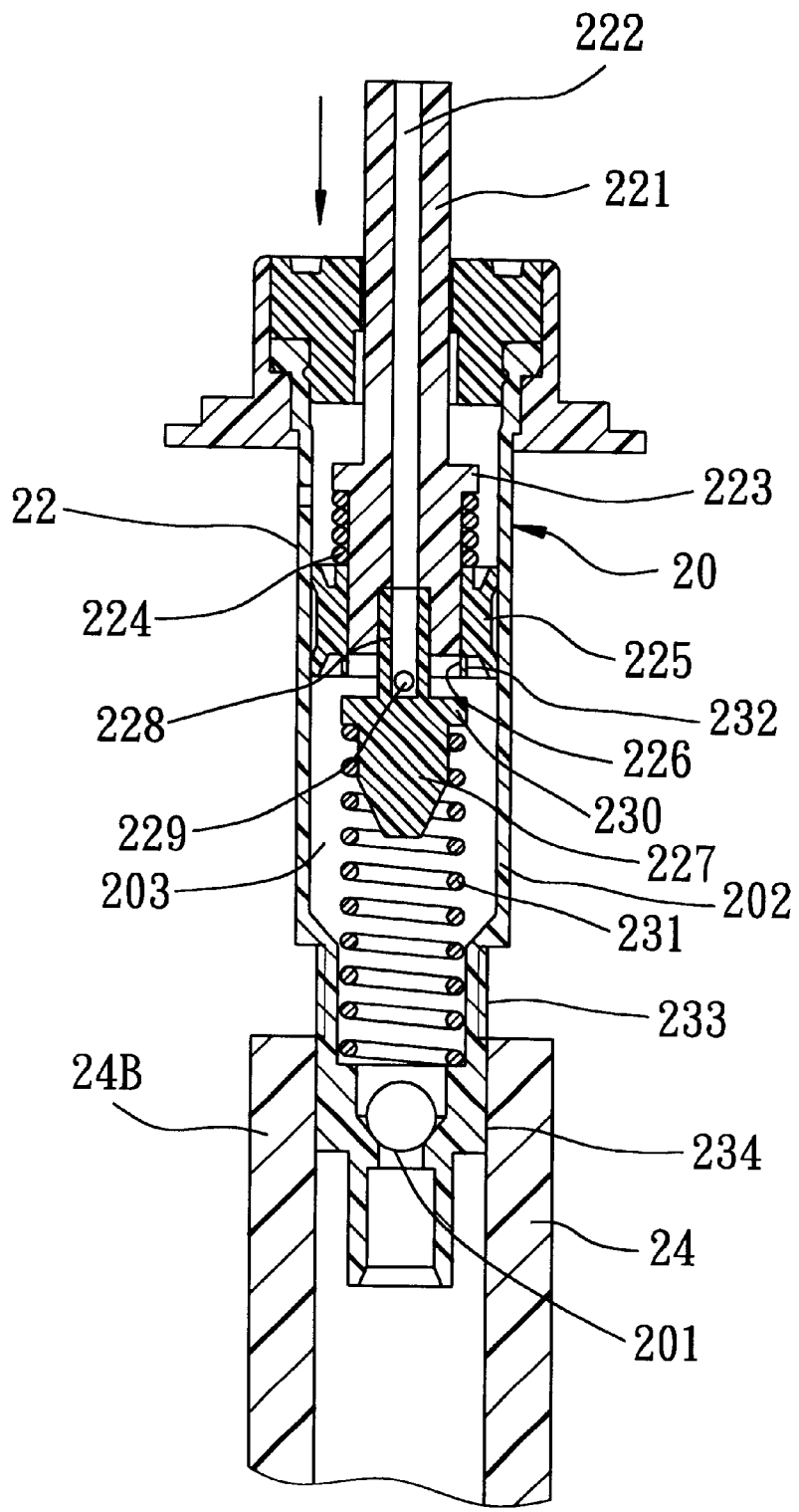
FIG. 3 is a sectional view illustrating operation of the piston pump unit of the preferred embodiment.

Referring to FIGS. 1 to 3, the preferred embodiment of a portable device for supplying filtered water according to the present invention is shown to include a container 10, a cap member 12, a partitioning member 5, a filter member 30, an intake tube 24, a piston pump unit 20, and a spout 211.

The container 10 includes upper and lower end walls 101, 102 that are spaced apart from each other in an axial direction, and a circumferential wall 103 extending therebetween and confining an accommodation space. The upper end wall 101 defines an opening 11 that permits entry of water to be purified into the accommodation space, and that is in fluid communication with the accommodation space.

The cap member 12 includes a mounting wall 120 that extends in a transverse direction relative to the axial direction, and that detachably and water-tightly covers the opening 11. The mounting wall 120 has a mounting hole 121. The cap member 12 is removable to permit access to the interior of the container 10.

The partitioning member 5 is disposed in the accommodation space, and includes a top wall 50 having a periphery and spaced apart from the mounting wall 121 in the axial direction, and an annular wall extending from the periphery in the axial direction and downwards to engage the lower end wall 102 water-tightly so as to divide the accommodation space into an outer chamber 6 and an inner chamber. The outer chamber 6 is between the circumferential wall 103 and the annular wall, and is in fluid communication with the opening 11 for receiving water 40 to be purified. The inner chamber is confined by the annular wall and the top wall 50. Furthermore, the top wall 50 is provided with a threaded hole 351, and a stepped portion 352 beneath the threaded hole 351.

The filter member 30 is preferably an annular member having a diameter slightly smaller than that of the opening 11 in the container 10. The filter member 30 includes inner and outer filter walls 31, 32, and a filter space 33 defined therebetween for receiving a replaceable filtering element 34, such as activated carbon. In this embodiment, the inner filter wall 32 serves as the annular wall of the partitioning member 5, and confines a purified water chamber 35 that serves as the inner chamber. The inner and outer filter walls 31, 32 are respectively provided with first outlet and inlet 311, 321, which are in fluid communication with the inner chamber and the outer chamber 6, respectively. Besides, the first outlet 311 is disposed downstream of the first inlet 321. The filtering element 34 is disposed downstream of the first inlet 321 and upstream of the first outlet 311 for purifying the water passing therethrough.

The intake tube 24 is disposed in the inner chamber, and includes a lower portion 24A disposed proximate to the lower end wall 102 and in fluid communication with the inner chamber, and an upper portion 24B extending upwardly from the lower portion 24A in the axial direction and secured by the stepped portion 352. The lower portion 24A of the intake tube 24 is formed with a fan-shaped positioning ribbed plate 241 for positioning the intake tube 24 in the filter member 30 without displacement.

The piston pump unit 20, having a known construction, is mounted in the mounting hole 121 in the cap member 12, and includes a cylinder 22, a piston member disposed in the cylinder 22, and a press element 21 disposed at a top end of the piston member for pressing by the user. The cylinder 22 has an inner cylindrical wall 202 surrounding an axis parallel to the axial direction and defining a cylindrical chamber 203, and a second inlet 201 at a bottom end thereof. The second inlet 201 is distal to the cap member 12 in the axial direction, and is in fluid communication with the upper portion 24B of the intake tube 24. The piston member includes a piston rod 221 and a hollow piston disk 225 fitted on a lower end portion of the piston rod 221. An inner wall 226 of the piston disk 225 is in frictional contact with and is movable slidably relative to an outer wall of the piston rod 221. The piston rod 221 is provided with an axially extending passage 222, and a stop ring 223 extending radially therefrom distal to the piston disk 225. The piston rod 221 is axially movable relative to the inner cylindrical wall 202, and extends outwardly of the cap member 12 through the mounting hole 121 to couple with the press element 21. An upper coil spring 224 is fitted over the piston rod 221 between the stop ring 223 and the piston disk 225. A spring securing stem 227 is welded to the lower end portion of the piston rod 221. The spring securing stem 227 has an upwardly extending hollow tube portion 228, and an annular flange 230 projecting outwardly therefrom. The tube portion 228 is provided with a second outlet 229 disposed at a bottom end thereof and surrounded by the piston disk 225. The second outlet 229 is proximate to the cap member 12 relative to the second inlet 201, and is in fluid communication with the passage 22. The cylindrical chamber 203 is in fluid communication with the second inlet and outlet 201, 229, and is disposed downstream of the second inlet 201 and upstream of the second outlet 229. A lower coil spring 231 is fitted over the spring securing stem 227 with an upper end thereof abutting against the annular flange 230. The annular flange 230 has an upper surface that abuts against a lower edge 232 of the piston disk 225 to seal the second outlet 229 when the piston pump unit 20 is not actuated. When the piston rod 221 is pressed downwardly via the press element 21, as shown in FIG. 3, the piston disk 225 is forced to displace upwardly so that the lower edge 232 thereof moves away from the annular flange 230 of the spring securing stem 227. As such, the purified water 40' can enter the piston disk 225 through the second outlet 229 into the passage 22 within the piston rod 221, and can be pumped out of the container 10 for drinking purposes. In addition, a lower end portion of the cylinder 22 is provided with an external thread 233 for engaging the threaded hole 351, and a planar section 234 extending downwardly from the external thread 233 for insertable engagement with the upper portion 24B of the intake tube 24. The piston pump unit 20 may be disengaged from the filter member 30 for replacement of the filtering element 34.

The spout 221 is disposed on the piston member 225, and is in fluid communication with the passage 222 so that the purified water 40' can pass therethrough.

In use, the outer chamber 6 is filled with water 40 to be purified, such as tap water. The water 40 to be purified passes through the first inlet 321 in the outer filter wall 32, and through the filtering element 34 for purification. Purified water 40' flows out via the first outlet 311 into the purified water chamber 35. When the press element 21 is pressed, the piston member is actuated to suck the purified water 40' in the purified water chamber 35 up through the intake tube 24 and through the passage 222 for output via the spout 211.

With additional reference to FIG. 1, the inner filter wall 31 may be provided with a static charged water permeable film 312 on the side opposite to the outer filter wall 32 so as to obtain an enhanced filtering effect.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A portable device for supplying filtered water, comprising:

a container including upper and lower end walls disposed to be spaced apart from each other in an axial direction, and a circumferential wall extending therebetween and confining an accommodation space, said upper end wall defining an opening to admit entry of water to be purified into said accommodation space, said opening being in fluid communication with said accommodation space;

a cap member including a mounting wall extending in a transverse direction relative to the axial direction, and disposed to detachably and water-tightly cover said opening;

a partitioning member disposed in said accommodation space and including a top wall having a periphery and spaced apart from said mounting wall in the axial direction, and an annular wall extending from said periphery in the axial direction and downwards to engage said lower end wall water-tightly so as to divide said accommodation space into an outer chamber, which is between said circumferential wall and said annular wall, and which is in fluid communication with said opening so as to receive the water to be purified, and an inner chamber confined by said annular wall and said top wall;

a filter member disposed on said annular wall and including a first inlet disposed to be in fluid communication with said outer chamber, a first outlet disposed downstream of said first inlet and in fluid communication with said inner chamber, and a filtering element disposed downstream of said first inlet and upstream of said first outlet to purify by filtering the water passing therethrough;

an intake tube disposed in said inner chamber and including a lower portion disposed proximate to said lower end wall, and in fluid communication with said inner chamber, and an upper portion extending upwardly from said lower portion in the axial direction;

a piston pump unit disposed to be mounted in said cap member and including a second inlet distal to said cap member in the axial direction and in fluid communication with said upper portion, a second outlet proximate to said cap member, an inner cylindrical wall surrounding an axis parallel to the axial direction and defining a cylindrical chamber in fluid communication with said second inlet and outlet and disposed downstream of said second inlet and upstream of said second outlet, and a piston member provided with an axially extending passage which is disposed to be in fluid communication with said second outlet, said piston member being disposed in said cylindrical chamber and being movable axially relative to said inner cylindrical wall, and extending outwardly of said cap member so as to be actuated externally to lift the purified water up through said passage; and a spout disposed on said piston member and in fluid communication with said passage so that the purified water can pass therethrough.

2. The portable device for supplying filtered water of claim 1, wherein said filter member further includes outer and inner filter walls, which co-define a filter space therebetween for receiving said filtering element.

3. The portable device for supplying filtered water of claim 1, wherein said filter member is detachably mounted in said container.

4. The portable device for supplying filtered water of claim 1, wherein said filtering element is activated carbon.

* * * * *